United States Patent [19]

Morton et al.

[11] Patent Number: 4,743,904
[45] Date of Patent: May 10, 1988

[54] MILITARY COUNTERMEASURES PASSIVE SIGNATURE CANCELLATION SYSTEM

[75] Inventors: Thomas P. Morton, Lewisville, Tex.; Marcus L. Foster, Palm Bay, Fla.

[73] Assignee: The United States of America as represented by the Secretary of the Army, Washington, D.C.

[21] Appl. No.: 870,064

[22] Filed: May 22, 1986

[51] Int. Cl.$^4$ .......................... G01S 7/38; F41H 3/00; F41J 9/13
[52] U.S. Cl. ...................................... 342/14; 342/351; 250/504 R
[58] Field of Search .................. 342/13, 14, 52, 53, 342/351; 250/493.1, 503.1, 504 R; 343/872, 911 R, 911 L

[56] References Cited
U.S. PATENT DOCUMENTS 3,921,169 11/1975 Lazarchik et al. ............... 342/351 X

FOREIGN PATENT DOCUMENTS 2848072 5/1980 Fed. Rep. of Germany ........ 342/13

Primary Examiner—T. H. Tubbesing
Assistant Examiner—Gilberto Barrón, Jr.
Attorney, Agent, or Firm—Peter A. Taucher; John E. McRae

[57] ABSTRACT

A radiometric countermeasures system installable on a military tank to defeat a passive millimeter wave sensor in a guidance system on an enemy missile. The system comprises an oscillator source of mm waves; a variable attenuator connected to the oscillator to adjust the power level of the oscillator output signal; a circular polarizer connected to the attenuator; an antenna connected to the polarizer to broadcast mm wave radiation to the ambient atmosphere in which the military tank is located; and means for adjusting the attenuation of the attenuator such that total mm wave emission from the tank and from the antenna is substantially equal to the naturally-occurring mm wave radiation emitted by the background scenery in the vicinity of the tank.

2 Claims, 3 Drawing Sheets

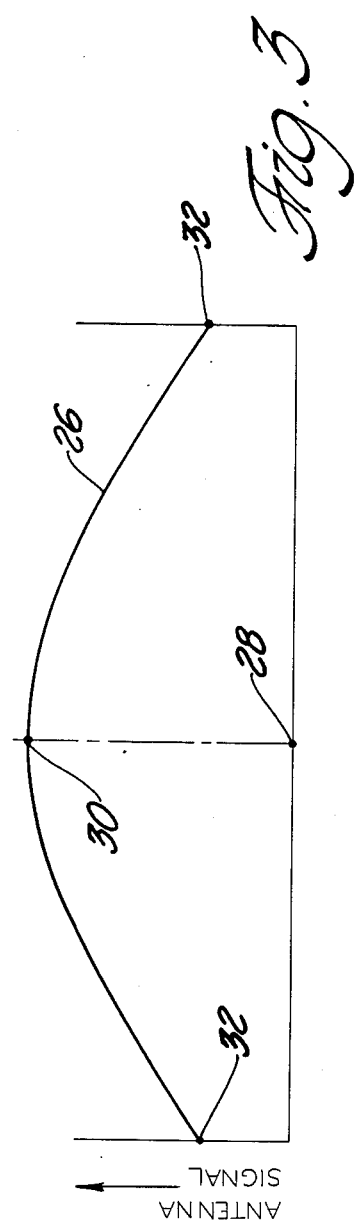
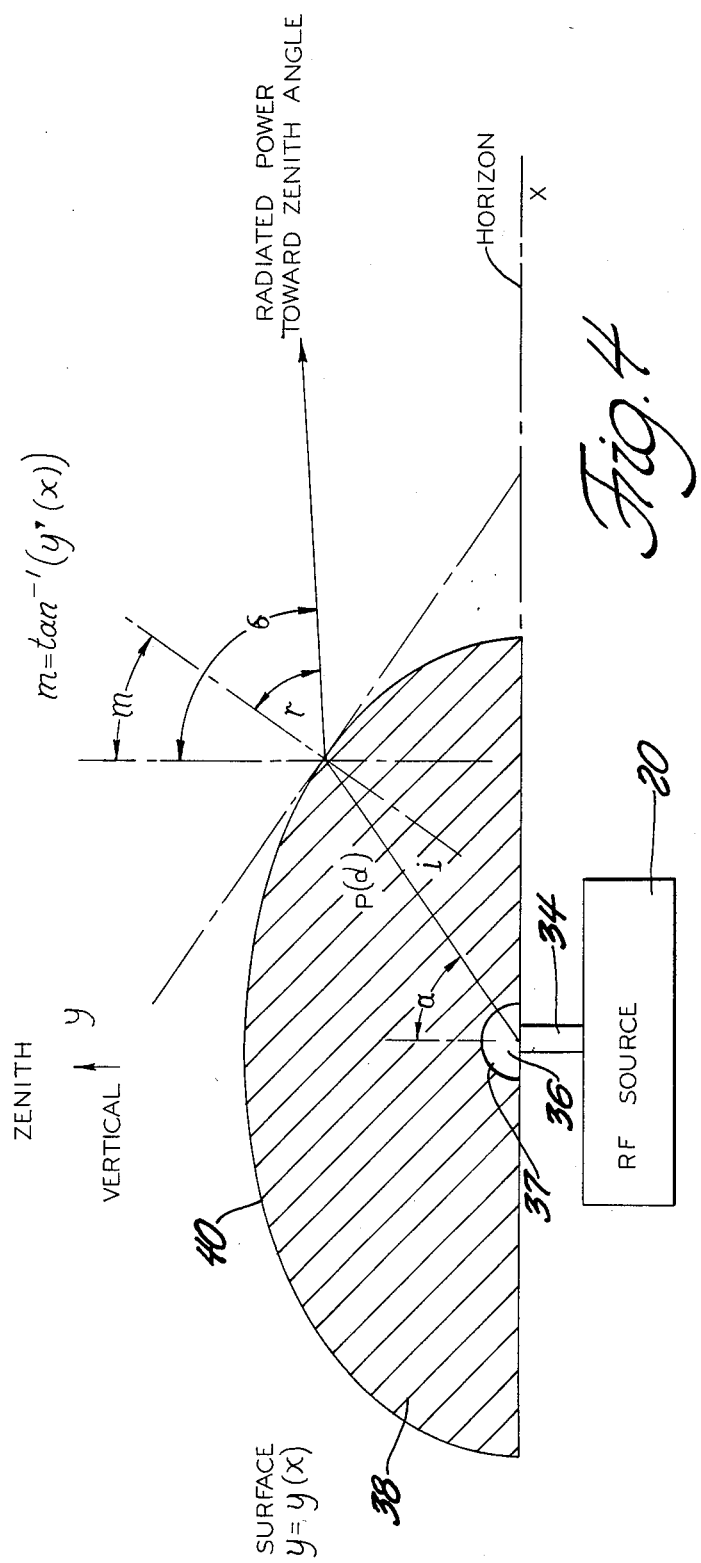

MILITARY COUNTERMEASURES PASSIVE SIGNATURE CANCELLATION SYSTEM

GOVERNMENT INTEREST

The invention described herein may be manufactured, used, and licensed by or for the Government for governmental purposes without payment to us of any royalty thereon. The Government has rights in this invention pursuant to Contract DAAE07-82-C-4077 awarded by Deptartment of the Army.

BACKGROUND AND SUMMARY OF THE INVENTION

This invention relates to military defense of a tank or similar structure subject to enemy missile attack. The invention contemplates an electronic mechanim for generating an electromagnetic field in the vicinity of the tank; the electric field is intended to have a power level that is sufficient to bring the tank's emitted radiation into approximate equivalency to the power intensity of radiation emitted by the background scene (trees, buildings, etc.). The invention seeks to substantially eliminate contrast between tank radiation and background radiation, thereby defeating the target-detecting abilities of the radiation-detection sensor in the enemy missile.

The invention was prompted by recent development of missile-guidance passive sensors operating in the millimeter wave portion of the electromagnetic spectrum. The term "passive" is here used to mean a sensor that responds to naturally occurring thermal emissions from the target (tank), as opposed to reflected signals resulting from target-seeking signals generated by mechanism contained within the missile. The absence of a specially-generated detector signal is advantageous for such reasons as reduced risk of sensor (missile) detection, reduced weight and power consumption by the missile guidance system, and reduced possibility of active jamming by the tank countermeasures system.

Passive missile guidance systems using millimeter waves at selected frequencies (e.g. 35 GHz or 94 GHz or 140 GHz) are believed to have the following general advantages: relatively low propagation losses (from the target to the sensor); satisfactory target detection with a reasonably small antenna aperture; and operability in particulate-laden atmospheres such as fog, rain or smoke. The major limitation of such systems appears to be a relatively low operating range of about 2 kilometers (in smoky atmospheres).

It is presently believed that an enemy would utilize passive mm wave sensors as missile guidance devices when faced with tank attack in bad weather or under smoky, dusty battlefield conditions. The present invention is viewed as an add-on countermeasures device for the tank to defeat the mm wave sensor in the enemy missile.

THE DRAWINGS

FIG. 3 is a chart depicting an antenna wave radiation pattern useful in practice of the invention.

FIG. 4 illustrates design features usable in a dielectric antenna forming part of the system depicted in FIGS. 1 and 2.

Figure 1:
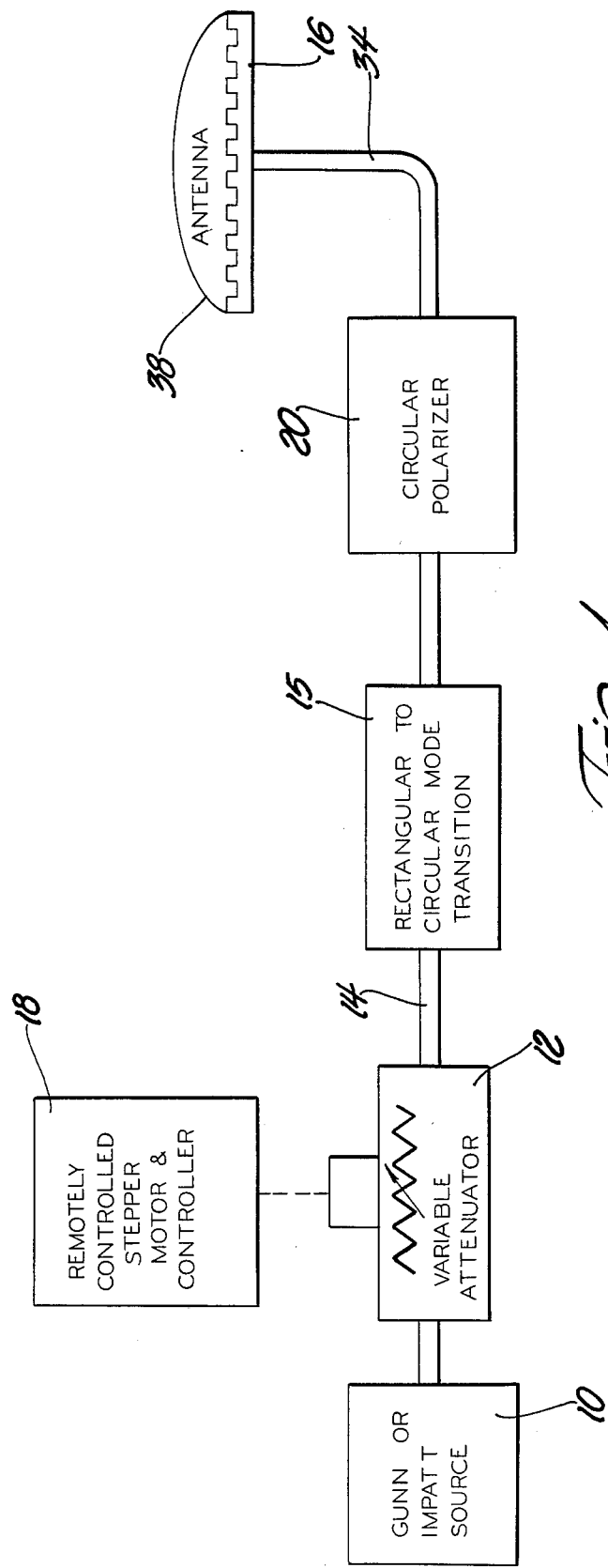
FIG. 1 is a schematic representation of a radiation-generating system designed to utilize the present invention.

The mechanism illustrated in FIG. 1 comprises an oscillator source of mm wave radiation designated by numeral 10. Oscillators suitable for this application can be obtained commercially, e.g. from Alpha TRG Industries of 0.20 Sylvan Road, Woburn, Massachusetts, or Hewlett Packard Co. of 1820 Embarcadero Rd., Palo Alto, California, or Kollmorgen Corp. at King Street, Northampton, Massachusetts. The selected oscillator should be capable of generating mm waves in at least one frequency range corresponding to the presumed frequency used by the passive sensor in the enemy missile. The presently contemplated frequencies are 35 GHz, 94 GHz and 140 GHz. Frequency selection is related primarily to signal attenuation by the atmosphere (between the missile and the target). Such attenuation is relatively low at the noted frequencies.

The electromagnetic signal generated by oscillator 10 is passed through a variable attenuator 12 to produce a signal intensity in line 14 of sufficient strength that antenna 16 is able to eliminate electromagnetic contrast between the tank and background scene. The signal attenuation produced by attenuator 12 is controlled or varied by controller means 18. A circular polarizer 20 is interposed between attenuator 12 and antenna 16 to convert the linearly polarized source signal to a circular polarized signal having equal portions of vertically and horizontally polarized power.

Antenna 16 is preferably designed to produce a wide pattern of radiation in azimuth and elevation. The antenna would in most cases be oriented to radiate signals upwardly and outwardly for the full 360 degree azimuth direction, to thus cause signal impingement on a passive sensor located in an overhead enemy missile approaching from any direction on the horizon. Components 10, 12, 20 and 16 can be mounted in a box located on an exterior surface of the tank hull or turret. Controller 18 can be located within the hull.

Controller 18 can be controlled manually or by an automatic means responsive to background radiation (of the designated frequency). Assuming that controller 18 is to be controlled manually, the human operator is provided with information on the emission levels known to be produced by various different types of backgrounds, e.g. grass, trees, paved roads, snow, dessert, buildings, etc. The information can be in the form of look-up tables or in the form of indicia on a dial plate associated with a power level selector at controller 18.

The information on background emissivity is used as a gauge of the total emission signature to be attained by the tank. That signature is comprised of the natural mm wave emission level of the tank (without antenna 16) plus the emission produced by the antenna. Prior to installation of the oscillator 10-antenna 16 assembly on the tank, measurements are taken of the vehicle signature and various types of background scene. The look-up tables or dial plate information is such that the human operator can select a controller 18 position of adjustment in accordance with the nature of the terrain in which the tank is situated, e.g. snow, dessert, etc. As the tank moves into different physical environments controller 18 is adjusted accordingly.

With the described add-on countermeasures system the sensor in the enemy missile sees a relatively uniform level of radiation in the selected frequency. The enemy sensor is unable to sense any significant contrast between the tank signature and the signature of the surrounding scene. To the enemy sensor the tank is invisible; i.e. there is no tank.

Figure 2:
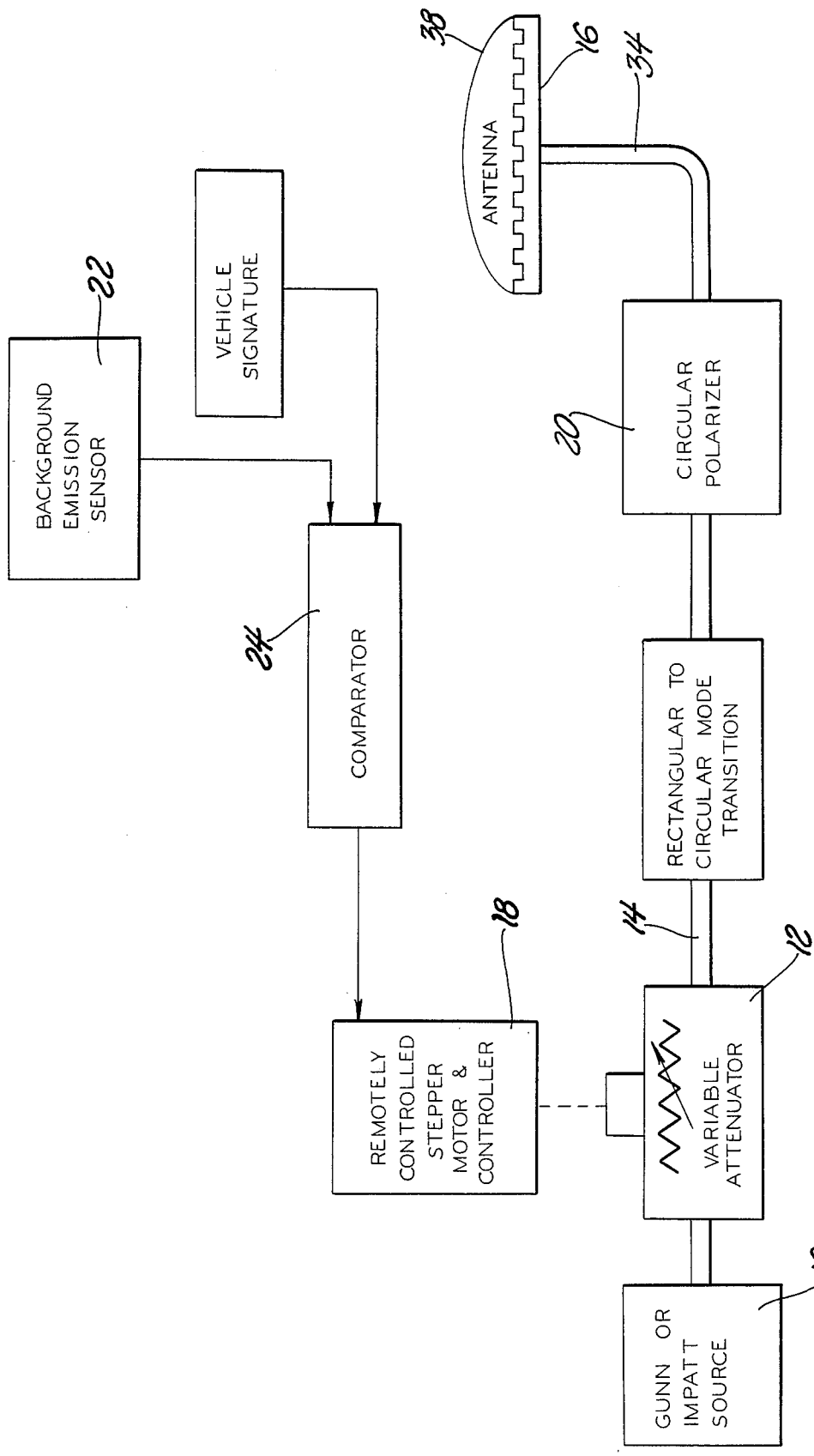
FIG. 2 is similar to FIG. 1, but illustrating an additional automatic control feature usable in practice of the invention.

As previously noted, controller 18 can be controlled automatically. One possible automatic control mechanism (shown in FIG. 2) includes a passive mm wave sensor 22 similar to the sensor employed in the enemy missile, e.g. a silicon Schottky-barrier mixer diode or a P-N junction varactor. The sensor is targetted on the exterior zone near the tank. The electrical output of the sensor is used as one input to a comparator 24, whose other input is a pre-established (known) signal representing the signature of the tank. The comparator output is applied to motor controller 18 for effecting automatic adjustment of attenuator 12. FIG. 2 schematically illustrates a system designed to achieve automatic control of attenuator 12 and the antenna output.

When the automatic control feature is used there is a possibility that the electromagnetic radiation emitted by antenna 16 can constitute a false signal to the emission sensor in the control mechanism. Therefore, it is believed that a cycle switch should be included in the sensing-controlling circuit, such that antenna 16 is in the "off" mode when the sensor is in is operative "sensing" mode. Terrain radiation sensing is not needed on a continuous basis; periodic sensing is all that is required. Antenna 16 would be in its transmit mode except for the relatively infrequent sensing periods. The requirements can be met with pre-programmed computer type controls equipped with memorized information and suitable connections to the radiation sensor.

The invention has been described as an add-on countermeasures device for a military tank. However, it is believed that the concept could be applied to other military structures, e.g. ships, planes, friendly missiles, fixed gun emplacements, helicopters, etc. In applying the concept to a particular vehicle or structure the radiometric signature of that vehicle should first be determined, preferably by test measurements taken on a clear day at suitable distances and elevational angles related to expected angle of attack of the enemy missile. Radiometric signature is related to the size of the structure and its orientation to the mm wave sensor.

It is believed possible to tune or program oscillator 10 so that it produces a multiple number of frequencies or frequency-centered band widths on a time-share basis, e.g. 35 GHz or 94 GHz or 140 GHz. Another possibility is to use three separate oscillator-antenna systems set at different ones of the desired frequencies or frequency bands. Whatever frequency is used, the system functions as a countermeasure only against passive enemy sensors. It will not be effective against enemy sensors of the active type; energy levels are too low for that purpose.

We wish it to be understood that we do not desire to be limited to the exact details of construction shown and described for obvious modifications will occur to a person skilled in the art, without departing from the spirit and scope of the appended claims.

The aforementioned antenna 16 should be designed with the specific radiometric target (tank) in mind. One power distribution pattern for the antenna is shown in FIG. 3, as designated by curve 26. In FIG. 3 point 28 represents the antenna power source, point 30 represents the power intensity at a location directly above the antenna, and points 32 represent the power signal intensity at locations on the horizon, to the left or right of source point 28.

FIG. 4 illustrates some features of antenna design useful in practice of the invention. A circular waveguide 34 directs mm waves from source 20 to a hemispheric cavity 36 in a dielectric lens 38. Radiation entering the dielectric through cavity 36 is unrefracted enroute to the dielectric outer surface 40. In FIG. 4 the Y axis represents the vertical direction; the X axis represents the horizon.

In FIG. 4 $\delta$ is the angle from zenith to a particular output radiation direction, and $\alpha$ is the zenith angle of radiation leaving the open waveguide 34. The hemispherical surface 37 (that defines cavity 36) is in the far field of the open waveguide. Rays incident on lens surface 40 from within the dielectric are refracted from zenith angle $\alpha$ to zenith angle $\delta$ in accordance with Snell's Law. The basic equations describing the refraction lead to the equation:

$$\sin r = n \sin i \qquad (1)$$

where
  r = angle of refraction
  n = refractive index of dielectric, and
  i = angle of incidence of radiation on surface of dielectric from within The following trigonometric relations apply to FIG. 4

$$i = \alpha - m, \text{ and}$$

$$r = \delta - m \qquad (2)$$

where m = slope angle of dielectric surface

The above relationships may be substituted into equation (1) to obtain the following equation:

$$\sin(\delta - m) = m \sin(\alpha - m) \qquad (3)$$

When the pattern $I_1(\alpha)$ of the open waveguide is known, and when the desired distribution pattern $I_2(\delta)$ is known, the radiation intensity at angle $\alpha$ may be refracted to the desired angle $\delta$ by selecting the appropriate slope angle m on the dielectric surface to satisfy equation (3). When the slope angle m of the surface y(x) is found, the contour of the entire surface 40 may be determined.

This design process results in a dielectric lens which will transform the distribution pattern $I_1(\alpha)$ of the primary open waveguide source into a pattern $I_2(\delta)$ constituting the desired antenna output pattern of FIG. 3. In the case of armored vehicles the lens will be oblate, i.e., shorter in vertical height than in horizontal radius. One other consequence is that the power delivered into a unit solid angle at direction $\delta$ will be less than that delivered into a unit solid angle at direction $\alpha$ by the factor:

$$\frac{\sin \alpha}{\sin \delta} \qquad (4)$$

This factor relates the ratio of the solid angle the radiation fills before refraction to the solid angle it fills after refraction. The radiation also incurs a loss $L(\alpha)$ in traveling through a radial distance $P(\alpha)$ of the dielectric lens. Therefore, the intensity $I_1(\alpha)$ which is refracted to $I_2(\delta)$ is related to $I_2(\alpha)$ by $$\frac{l_1(\alpha)\sin\alpha}{L(\alpha)\sin\delta} = I_2(\delta) \tag{5}$$

FIG. 4 represents a presently preferred antenna design useful in practice of the invention. Actual hardware demonstration and field test would be needed to be reasonably assured of an optimized antenna design.

As noted previously, the aim is to obtain a generally uniform degree of target (tank) signature cancellation irrespective of variations in the enemy missile's viewing angle.

The invention was conceived with the aim of being able to utilize commercially available components. It is believed that the system of FIG. 1 could be constructed, using the following components:

| Component | Commercial Part |
| --- | --- |
| Source 10 | Hughes Aircarft Part No. 4717-6H-1205 |
| Attenuator 12 | Alpha Trg Part No. W510 |
| Motor-Controller 18 | Rapid-Syn Dana Model 23D 6102C Motor, DCP-23 Controller |
| Mode Transition 15 | Alpha Trg Part No. W884 |
| Polarizer 20 | Alpha Trg Part No. W882 |
| Antenna 16 | Alpha Trg Part No. W863/C |

We wish it to be understood that we do not desire to be limited to the exact details of construction shown and described for obvious modifications will occur to a person skilled in the art, without departing from the spirit and scope of the appended claims.

We claim:

1. A radiometric countermeasures system installable on a military tank to defeat a passive millimeter wave sensor in a guidance system on an enemy missile: said system comprising an oscillator source of mm waves; a variable attenuator (12) connected to the oscillator to adjust the power level of the oscillator output signal; a circular polarizer (20) connected to the attentuator; a stationary non-scanning antenna (16) positioned on an upper surface of the tank, said antenna being connected to the polarizer to broadcast mm wave radiation to the ambient atmosphere in which the military tank is located; and means (18) for adjusting the attenuation of the attentuator such that total mm wave emission from the tank and from the antenna is substantially equal to the naturally-occurring mm wave radiaton emitted by the background scenery in the vicinity of the tank; said antenna including a dielectric lens of oblate upwardly-facing hemispheric construction, said lens having a vertical height that is less than its horizontal radius measured normal to its height, to provide a variable power distribution pattern of greater intensity directly overhead and lesser intensity toward the horizon.

2. The system of claim 1, and further comprising a comparator means for controlling the attentuator-adjusting means; said comparator means having a first input signal representative of background scene emissions and a second signal representative of tank emission.

* * * * *